US011886215B2

(12) United States Patent
Fiocchi

(10) Patent No.: US 11,886,215 B2
(45) Date of Patent: Jan. 30, 2024

(54) VOLTAGE REGULATOR, INTEGRATED CIRCUIT AND METHOD FOR VOLTAGE REGULATION

(71) Applicant: ams AG, Premstätten (AT)

(72) Inventor: Carlo Fiocchi, Premstätten (AT)

(73) Assignee: AMS AG, Premstätten (AT)

( * ) Notice: Subject to any disclaimer, the term of this patent is extended or adjusted under 35 U.S.C. 154(b) by 296 days.

(21) Appl. No.: 17/436,677

(22) PCT Filed: Mar. 5, 2020

(86) PCT No.: PCT/EP2020/055872
§ 371 (c)(1),
(2) Date: Sep. 7, 2021

(87) PCT Pub. No.: WO2020/182618
PCT Pub. Date: Sep. 17, 2020

(65) Prior Publication Data
US 2022/0171417 A1 Jun. 2, 2022

(30) Foreign Application Priority Data
Mar. 12, 2019 (EP) .................................... 19162260

(51) Int. Cl.
*G05F 1/575* (2006.01)

(52) U.S. Cl.
CPC .................................... *G05F 1/575* (2013.01)

(58) Field of Classification Search
CPC ....... G05F 1/575; G05F 3/262; H03F 3/45475
See application file for complete search history.

(56) References Cited

U.S. PATENT DOCUMENTS 8,169,203 B1 * 5/2012 Vemula .................. G05F 1/575 323/273
9,436,197 B1 9/2016 Tang et al.
10,031,541 B1 7/2018 Bernardon
2005/0057234 A1 3/2005 Yang et al.
2008/0265853 A1 10/2008 Chen et al.
(Continued)

FOREIGN PATENT DOCUMENTS

CN 101295189 A 10/2008
CN 102880219 A 1/2013
(Continued)

OTHER PUBLICATIONS

Chinese First Office Action and Search Report in Chinese Application No. 202080019993.0 dated Jul. 20, 2022, 7 pages.
(Continued)

*Primary Examiner* — Kyle J Moody
(74) *Attorney, Agent, or Firm* — MH2 TECHNOLOGY LAW GROUP LLP

(57) ABSTRACT

A voltage regulator comprises an output transistor with a controlled section connected between a first supply terminal and an output terminal. An amplifier comprises a reference input and a feedback input. A current mirror comprising a replica transistor. The current mirror is configured to mirror and attenuate a load current supplied by the output transistor to the replica transistor. A filter circuit is coupled to a controlled section of the replica transistor and coupled to the feedback input of the amplifier via the output terminal.

16 Claims, 4 Drawing Sheets

(56) References Cited

U.S. PATENT DOCUMENTS

| | | | | |
|---|---|---|---|---|
| 2012/0038332 A1* | 2/2012 | Lin | | G05F 1/575 323/277 |
| 2013/0285631 A1 | 10/2013 | Bisson et al. | | |
| 2016/0048148 A1 | 2/2016 | Lee et al. | | |
| 2018/0173261 A1 | 6/2018 | Dahl | | |

FOREIGN PATENT DOCUMENTS

| | | |
|---|---|---|
| CN | 105652945 A | 6/2016 |
| CN | 106094955 A | 11/2016 |
| CN | 107750351 A | 3/2018 |
| EP | 2772821 B1 | 9/2014 |
| KR | 20180018757 A | 2/2018 |

OTHER PUBLICATIONS

Korean Office Action with English Translation in Korean Application No. 9-5-2022-094657607 dated Dec. 5, 2022, 8 pages.
Man, T. et al., "Development of Single Transistor Control LDO based on Flipped Voltage Follower for SoC", IEEE Transactions on circuits and systems, Jun. 2008, vol. 55, No. 5, pp. 1392-1401.
Moon et al., "Design of low power, fast transient response, capacitorless lowdropout regulator for mobile applications", EICE Electronics express, 2016, vol. 13, No. 23, pp. 1-6.
Pereira, J., "Ultra Low Power Capless Low-Dropout Voltage Regulator", Master Thesis Extended Abstract—Department of Electrical and Computer Engineering Instituto Superior Tecnico, Jun. 2013, 11 pages.
Pui Ying Or et al., "An output-capacitorless lowdropout regulator with direct voltage-spike detection", IEEE Journal of Solid-State Circuits, Feb. 2010, vol. 45, No. 2, pp. 458-466.
Xi Qu et al., "An Ultralow-Power Fast-Transient Capacitor-Free Low-Dropout Regulator with Assistant Push-Pull Output stage", IEEE Transactions on circuits and systems, Feb. 2013, vol. 60, No. 2, pp. 96-100.
International Search Report and Written Opinion in corresponding International Application No. PCT/EP2020/055872 dated May 25, 2020, 16 pages.
Second Chinese Office Action with English Translation issued in Chinese Application No. 202080019993.0 dated Apr. 28, 2023. 10 pages.

* cited by examiner

VOLTAGE REGULATOR, INTEGRATED CIRCUIT AND METHOD FOR VOLTAGE REGULATION

CROSS-REFERENCE TO RELATED APPLICATIONS

The present application is the national stage entry of International Patent Application No. PCT/EP2020/055872, filed on Mar. 5, 2020, and published as WO 2020/182618 A1 on Sep. 17, 2020, which claims the benefit of priority of European Patent Application Nos. 19162260.4, filed on Mar. 12, 2019, all of which are incorporated by reference herein in their entirety.

The invention relates to a voltage regulator, such as a low dropout regulator. Furthermore, the invention relates to an integrated circuit comprising one or more of the proposed voltage regulators, and to a method for voltage regulation.

In analog and digital circuit design it is often necessary to provide different voltage supplies in a chip. For example, a digital supply often provides a very low voltage value for reasons of reliability, while analog circuitry often concerns with dynamic range demands. These different demands do not always comply with each other. Sometimes it is also beneficial to avoid crosstalk of the parts of a circuit architecture, e.g. by means of dedicated supplies for sensitive parts. Among several solutions for voltage regulators, a capacitorless version, where no external load capacitors are used, is getting more and more popular in order to prevent that a number of external pins would increase with the number of regulators used on the chip. As one main drawback, however, common voltage regulators may only poorly filter the regulated voltage. When the regulated voltage should be in the order of 1 or 2 V, the device reliability can already be reduced by overshoots in the order of a couple of some hundred mV, which can be easily occur after a load current variation unless particular care is not taken.

Sensitivity to overshoot has been addressed in the art. Rendering a response to an overshoot event as fast as possible made one approach. For a reasonable trade-off with power consumption, a class AB approach has been largely adopted but also capacitive coupling layouts are getting more and more popular nowadays. For example, a spike at the output of the voltage regulator may be coupled to a bias current generator to increase its value only for the duration of the spike. This way a more immediate response can be obtained while preserving the low power feature.

A capacitive coupling concept has been published by Pui Ying Or and Ka Nang Leung: "An output-capacitorless low-dropout regulator with direct voltage-spike detection", in IEEE Journal of Solid-State Circuits, 45(2):458-466, February 2010. The proposed voltage regulator features fast response to overshoot events. For example, if the output has a positive spike, the capacitive coupling increases the current in a current mirror transistor so that a gate of a PMOS output transistor is promptly pulled up for fast turning off. A negative spike forces the reference at a diode in another current mirror to a lower value to increase the current and promptly pull down the gate at the PMOS output transistor. Unfortunately, there are some remarkable drawbacks with this solution. In most cases, the boosted current path crosses the current mirrors mentioned above. This implies that the speed may be an issue, e.g. when the load is a digital circuit. Moreover, coupling of a capacitor at an output node with an internal bias may result in a poor high frequency power supply rejection ratio, PSRR, once the coupled node tracks the supply voltage, Vdd.

Despite many attempts which feature a limited power consumption, the amplifier speed of voltage regulators experience several bottlenecks. As discussed above implementation of current mirrors is one issue but it is also remarkable that larger, even if temporary, currents typically demand bigger transistors. This leads to larger parasitic capacitances which often frustrate speed achievements. All this considered, the solutions cannot be as fast as often necessary in order to address short scale overshoot events.

It is an object to provide a voltage regulator, an integrated circuit and a method for voltage regulation which allow for improving overshoot performance.

These objectives are achieved by the subject matter of the independent claims. Further developments and embodiments are described in dependent claims.

It is to be understood that any feature described in relation to any one embodiment may be used alone, or in combination with other features described herein, and may also be used in combination with one or more features of any other of the embodiments, or any combination of any other of the embodiments unless described as an alternative. Furthermore, equivalents and modifications not described below may also be employed without departing from the scope of the voltage regulator, integrated circuit and method for voltage regulation which are defined in the accompanying claims.

The following relates to an improved concept in the field of overshoot suppression in voltage regulators. It has been observed that in a low dropout regulator, or LDO, the impact of an overshoot after a load transient depends on the ratio between consecutive load current values. Hereinafter the term "overshoot" relates to an output of a voltage regulator, e.g. a low dropout regulator, LDO, which exceeds its nominal steady state value. The term "overshoot event" denotes an event, such as a sudden drop in load current, which causes the overshoot event. For example, during an overshoot a first value of load current is high and may drop instantaneously to a much lower second value of load current once the overshoot event has ceased. Such a "jump" between values may have a larger impact the larger the ratio of first and second values of load current. For instance, it may be more critical to jump from 101 mA to 1 mA than instead from 150 mA to 50 mA. In these two examples the jump is the same in absolute terms but different in relative terms. Thus, introducing an offset into the load current may affect the overall impact of overshoot event.

In the following a voltage regulator is proposed which comprises an output transistor to sense a load current. An attenuated replica of said load current is filtered and re-injected as additional load of the output transistor by means of a replica transistor and filter circuit. As a consequence the overall load current is the sum of the load current due to the regular load and the re-injected attenuated replica. In case of an overshoot event the load current does not drop instantaneously to low or zero load current levels but rather to a fraction of the initial load current before the overshoot event. Furthermore, due to ongoing re-injection of attenuated replica the overall load current settles on a slower time scale.

For example, said time scale can be controlled using appropriate parameters, such as an attenuation factor or a time constant of the filter circuit etc., to be more easily tracked by the amplifier of the voltage regulator. In fact, a ratio of consecutive load current values may depend on an attenuation factor. In this way the overall load current may not drop suddenly from a high to low current value, thus, improving overshoot performance.

In at least one embodiment a voltage regulator comprises an output transistor, an amplifier, a current mirror and a filter circuit. The output transistor comprises a controlled section which is connected between a first supply terminal and an output terminal. The amplifier comprises a reference input and a feedback input. Furthermore, the current mirror comprises a replica transistor. The filter circuit is coupled to a controlled section of the replica transistor and coupled to the output terminal.

In operation the output transistor is connected to a load and senses a load current. The reference terminal is connected to a reference supply. The current mirror is configured to mirror and attenuate the load current which is supplied by the output transistor to the replica transistor. Thus, an attenuated load current, or replica of the load current, is supplied by the replica transistor. The replica is then filtered by the filter circuit and re-injected as additional load to the output transistor via the output terminal. As a consequence the overall load current is the sum of the load current due to the load and the re-injected attenuated load current, i.e. replica. Due to the filtering the replica is re-injected with a certain time delay. In case of an overshoot event the overall load current may not instantaneously drop to low current levels, or zero load current levels, but rather to a fraction of the initial load current before the overshoot event. Furthermore, due to ongoing delayed re-injection of the replica the overall load current settles on a slower time scale.

As a consequence the load current profile, i.e. load current as a function of time, can be made smoother and may allow the amplifier to track the load current profile more easily. In fact, the amplifier may provide the desired response even after an overshoot event and keep the positive output variation small. The proposed concept follows a different approach on overshoot protection. Instead of trying to make the amplifier as fast as the technology allows the load current profile is altered. In contrast to other solutions the proposed concept exploits the sensing of the load current not to act the amplifier bias but to modify the load current profile. Being concerned with positive spikes, it can be shown that a large, positive, overshoot event takes place if the load current changes very fast, faster than the amplifier response, of a very large amount. Taking into account non-linear behavior of transistors, such as MOSFET or BJT, a variation at the gate of the output transistor can be remarkably different when settling from, e.g., several mA to 1 μA or to 10 μA or 100 μA. This means that less swing may be required at the output transistor so that equilibrium can be reached in a shorter time and overshoot event is, if not prevented, largely reduced. As a loop gain remains unaltered, constraints on amplifier stability or dynamic range are of no concern. In addition, it has been found that the proposed concept is not alternative but synergic to other voltage regulator designs and, thus, can be added to existing circuit layout.

In at least one embodiment the amplifier comprises a feedback input. The filter circuit is coupled to a controlled section of the replica transistor and connected to the feedback input of the amplifier via the output terminal.

In at least one embodiment the output transistor and the replica transistor are PMOS transistors. The current mirror comprises both the output transistor and the replica transistor, wherein the controlled sections of the output transistor and the replica transistor are connected to each other. For example, the source of the output transistor is electrically connected to the source of the replica transistor. The current mirror constitutes a PMOS mirror. The load current supplied by the PMOS output transistor, as power transistor, is mirrored and attenuated according to the properties of the PMOS mirror.

In at least one embodiment the output transistor is a NMOS transistor and the replica transistor is a PMOS transistor. The current mirror comprises a diode-connected PMOS transistor such that the controlled sections of the diode-connected transistor and the replica transistor are electrically connected to each other via a circuit node. For example, the source of the diode-connected PMOS transistor is electrically connected to the source of the replica transistor. The output transistor is connected to the circuit node via its controlled section, e.g. via drain.

The current mirror constitutes a PMOS mirror while the output transistor is NMOS. The load current supplied by the output transistor, as power transistor, is mirrored and attenuated at the drain of the power transistor, for example. Thus, the output transistor can be implemented using both NMOS and PMOS technology. The term "diode-connected transistor" denotes connecting a three-terminal transistor as a two-terminal rectifying device, i.e. a diode. In the proposed embodiment the diode-connected transistor is made by connecting the gate and drain of a MOSFET, such as a PMOS transistor.

In at least one embodiment the replica transistor is configured to attenuate the load current by a factor k. The factor k is a real number. In general, the current mirror provides an output current which is proportional to the input current, i.e. the load current. The factor k, or attenuation factor, constitutes a proportionality factor indicative of the attenuation. For example, the amplifier may react over a load transient due to an overshoot event. Starting from a considerably large value due to the overshoot event, denoted first value, the load transient may abruptly drop not to the smallest possible current value one but to a second value which is proportional to 1/k of the first value. As time proceeds the load current settles from the second value to a minimum or even zero. This gradual settling can be made slowly enough to be trackable by the amplifier.

In at least one embodiment the factor k is determined by the replica transistor. For example, adjusting the width-to-length ratio of the replica transistor defines a value of the factor k.

In at least one embodiment the filter circuit comprises a cascaded current mirror. The cascaded current mirror is connected to the controlled section of the replica transistor. Furthermore, the cascaded current mirror is connected via the output terminal to the controlled section of the output transistor. The filter circuit filters the attenuated load current provided by the replica transistor. The cascaded current mirror re-injects the attenuated and filtered load current in parallel to the load current. In this way, the output transistor gets configured to source an overall load current having contributions of the current load current originating from the load and the delayed and attenuated replica of it, for example.

In at least one embodiment the filter circuit comprises a resistor capacitor network with at least one time constant. The time constant together with the attenuation factor k affects how the load transient evolves with time. For example, after dropping from the first load current value in the aftermath of an overshoot event the overall load current reaches the second load current value. By implementing the filter circuit using the resistor capacitor network the load transient may further drop from the second load current value as an exponential function. This exponential function may be a function of time and have the attenuation factor and one or more time constants as parameters. Both attenuation factor and time constants can be adjusted by means of hardware.

The resistor-capacitor network comprises at least one resistor and capacitor, for example. The capacitor can be coupled to a ground potential or, alternatively, to the output terminal. Filtering due to the filter circuit essentially has a same characteristic in both implementations, e.g. the resistor is affected by the capacitor being amplified by the Miller effect. However, coupling the capacitor to the output terminal allows for implementing a bias boosting. In the event of an overshoot event, e.g. a positive spike, boosting of current pulls down the regulator output directly at the output terminal, i.e. instead of at the output transistor, for example. This contributes to further reduce overshooting at the output.

In at least one embodiment the filter circuit, e.g. the resistor capacitor network, comprises several different time constants. For example, a first time constant with a lower value to immediately track a positive load current variation, and a second time constant with a higher value than the first to smoothen the load current transient when the load current is decreasing from the second load current value, i.e. after the overshoot event. Even though implementing the filter circuit with several different time constants becomes more complex, this allows for accounting for load transients at different time scales.

In at least one embodiment the time constant depends on a bandwidth of the amplifier. The mirrored and attenuated load current is reinjected via the output terminal on a timescale trackable by the amplifier. The actual time constant(s) are determined by the implementation of the resistor capacitor network and may be subject to the following tradeoff. The bandwidth of the amplifier determines its ability to track an input load current. In fact, a smooth load transient allows for easier tracking and is better supported by a large time constant. A large time constant, on the contrary, prevents short current pulses due to an overshoot event from being tracked and may render the implemented correction less effective. Nevertheless, if the load current pulse is very short, the amplifier may not be able to track the load current in either case, so no overshoot event due to an excessive current injected from the power transistor into the output terminal might be recognized by the amplifier after the pulse expires. This leaves some room for a time constant value large enough to ensure an acceptably smooth profile. For example, considering a response time $\tau_0$, determined by a gain bandwidth of the voltage regulator, such as LDO, a load current change $\Delta I$ should not be capable to discharge the regulated output more than a given amount $\Delta Vout$, e.g. $\Delta I \cdot \tau_0 < Cload \cdot \Delta Vout$. This amount may depend on the LDO accuracy requirements.

In at least one embodiment the resistor capacitor network is arranged in a connecting branch of the cascaded current mirror. This way the mirrored and attenuated load current is filtered immediately before it is re-injected in the output terminal.

In at least one embodiment the amplifier comprises an output-capacitorless low dropout regulator. Such a voltage regulators may not need external load capacitors and may, thus, prevent that the number of external pins would increase as the number of voltage regulators used in an integrated circuit or chip. It is pointed out, however, that other designs of voltage regulators can be combined with the proposed concept in a synergetic manner. LDOs or output-capacitorless constitute one possible embodiment which should not be considered restricting the scope of what is proposed herein in any way.

In at least one embodiment the amplifier comprises an amplifier core, an error amplifier, and a first and second bias current generator. The amplifier core comprises the output transistor and the error amplifier. The error amplifier comprises an input transistor which is connected, via the output terminal, in series to the controlled section of the output transistor and, via its controlled section, connected to an input terminal. Furthermore, the error amplifier comprises a folding transistor which is coupled between the controlled section of the output transistor and the controlled section of the input transistor. The first and the second bias current generators comprises a first and a second tail current source, respectively. The first and the second tail current sources are coupled to the output terminal via a first and a second coupling capacitor, respectively.

The amplifier introduced above is based on the error amplifier as an input element and the output transistor as power transistor. The amplifier generates a regulated voltage at the output terminal by means of a feedback loop which comprises the folding transistor and the output transistor. The first and second coupling capacitors couple output spikes in the load current which are due to overshoot events to the tail current sources, acting as bias current generators, in order to temporarily increase bias currents in the amplifier. This leads to reduction of output spikes in the load current. Thus, the amplifier has the effect to counteract an overshoot event. However, once the overshoot event occurred re-injection of attenuated and delayed load current based on the replica transistor and filter circuit supports that the voltage regulator returns to normal operation.

In at least one embodiment an integrated circuit comprises at least one or more digital and/or analog circuits. The integrated circuit further comprises a voltage regulator according to the proposed concept above. Integrated circuits typically comprise one or more voltage regulators in order to supply analog and/or digital components. Regulated voltage supply, e.g. in the order of 1 or 2V, can be implemented with increased reliability and improved overshoot protection.

In at least one embodiment a method for voltage regulation comprises the steps of sensing a load current by means of an output transistor of a voltage regulator. The load current is mirrored and attenuated and supplied by the output transistor to a replica transistor. The attenuated load current is filtered by means of a filter circuit which is coupled to the replica transistor. Finally, the attenuated and filtered load current is reinjected as additional load current of the output transistor. As one consequence the overall load current is the sum of the load current due to the load and the re-injected attenuated load current, i.e. replica. Due to the filtering the replica is re-injected with a certain time delay. In case of an overshoot event the overall load current may not instantaneously drop to low current levels, or zero load current levels, but rather to a fraction of the initial load current before the overshoot event. Furthermore, due to ongoing delayed re-injection of the replica the overall load current settles on a slower time scale.

Using the proposed concept the load current profile, i.e. load current as a function of time, can be made smoother and may allow an amplifier to track the load current profile more easily. In fact, the amplifier may provide the desired response even after an overshoot event and keep the positive output variation small. In contrast to other solutions the proposed concept exploits the sensing of the load current not to act the amplifier bias but to modify the load current profile. As the loop gain remains unaltered, constraints on amplifier stability or dynamic range are of no concern. In addition, it has been found that the proposed concept is not alternative but synergic to other voltage regulator designs and, thus, can be added to existing circuit layout.

In at least one embodiment the attenuation and filtered load current is reinjected in parallel to the load current and after having been filtered by means of the filter circuit. This way the load current profile can be affected after an overshoot event has occurred.

In at least one embodiment the filter circuit has a time constant which depends on a bandwidth of the amplifier. The mirrored and attenuated load current is reinjected on a timescale which is trackable by the amplifier. The actual time constant or time constants are determined by the implementation of the filter circuit. The bandwidth of the amplifier determines its ability to track an input load current. In fact, a smooth load transient allows for easier tracking and is better supported by a large time constant. A large time constant, on the contrary, prevents short current pulses due to overshoot event from being tracked and may render the implemented correction less effective. Nevertheless, if the load current pulse is very short, the amplifier may not be able to track the load current in either case, so no overshoot event due to an excessive current injected from the power transistor into the output terminal might be recognized by the amplifier after the pulse expires. This leaves some room for a time constant value large enough to ensure an acceptably smooth profile.

Further implementations of the method for voltage regulation are readily derived from the various implementations and embodiments of the voltage regulator and integrated circuit and vice versa.

Further implementations of the method are readily derived from the various implementations and embodiments of the voltage regulator and vice versa.

In the following, the concept presented above is described in further detail with respect to drawings, in which examples of embodiments are presented. In the embodiments and Figures presented hereinafter, similar or identical elements may each be provided with the same reference numerals. The elements illustrated in the drawings and their size relationships among one another, however, should not be regarded as true to scale, rather individual elements, such as layers, components, and regions, may be exaggerated to enable better illustration or a better understanding.

FIG. 1 shows an example embodiment of voltage regulator comprising an amplifier AMP and an overshoot circuit OC. The overshoot circuit OC comprises an output transistor MPOUT, a current mirror comprising a replica transistor MREP, and a filter circuit RC which connects the replica transistor MREP to the output transistor MPOUT.

Figure 1:
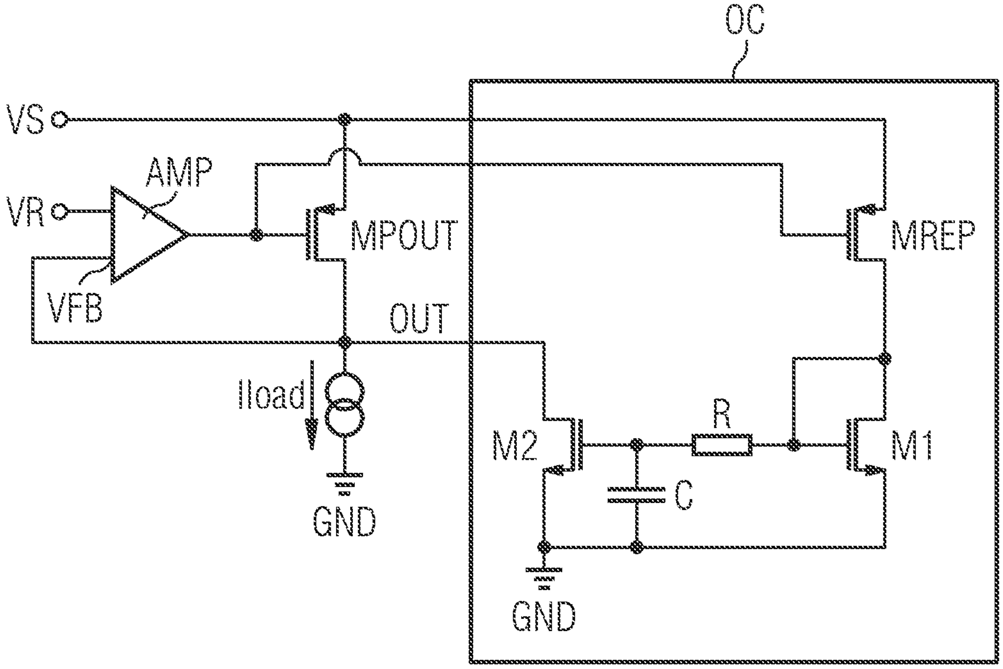
FIG. 1 shows an example embodiment of voltage regulator.

The amplifier AMP comprises a reference input VR which is connected to a reference potential and further a feedback input VFB. As will be explained in further detail below it has been found that the proposed overshoot circuit OC is not alternative but synergic to other voltage regulator designs and, thus, can be added to existing circuit layout. This reduces constraints on the design of the amplifier AMP and different designs can be implemented or complemented with the overshoot circuit OC. One example includes output-capacitorless low-dropout regulators. Other examples will be discussed in more detail with respect to FIGS. 5 and 6, respectively.

An output side of the amplifier AMP is electrically connected to the output transistor MPOUT. In this particular embodiment the output transistor MPOUT is a PMOS transistor with its gate connected to the output side of the amplifier AMP. Furthermore, the source of the output transistor MPOUT is connected to a supply terminal VS. A controlled section, e.g. the drain, of the output transistor MPOUT is connected to a load, represented as load current source Iload and, further, to the supply terminal VS.

The current mirror comprises both the output transistor MPOUT and the replica transistor MREP. Their controlled sections, e.g. source, are electrically connected to each other.

Furthermore, the control sections, e.g. gates, of the output transistor MPOUT and the replica transistor MREP are electrically connected to each other and to the output side of the amplifier AMP.

The filter circuit comprises a cascaded current mirror having a first and a second transistor M1, M2. The filter circuit comprises a resistor-capacitor network such as one or more RC filters having at least resistor R and capacitor C. In this embodiment the RC filter is arranged in a connecting branch of the cascaded current mirror, i.e. between the control sections, e.g. gates, of the first and second transistors M1, M2. Furthermore, the cascaded current mirror on its input side via the first transistor M1 is connected to a controlled section of the replica transistor MREP, e.g. drain of MREP.

An output terminal OUT of the voltage regulator is connected to the controlled section of the output transistor MPOUT, e.g. drain. Furthermore, the output terminal OUT is connected to an output side of the filter circuit, i.e. via a controlled section of the second transistor M2, e.g. drain. Another controlled section of the second transistor M2, e.g. source, is connected to a ground potential GND. Finally, the output terminal OUT is connected to the feedback input VFB of the amplifier AMP.

In operation the output transistor MPOUT is connected to the load current source Iload and senses a load current. The reference terminal VR is connected to a reference supply such that at its output side the amplifier AMP provides an output in terms of the reference supply. The current mirror mirrors and attenuates the load current which is supplied by the output transistor MPOUT as power transistor. Thus, an attenuated load current, or replica of the load current, is supplied by the replica transistor MREP. The replica is then filtered by the filter circuit. The filtered replica is then re-injected in parallel to the load current as an additional load to the output transistor MPOUT via the output terminal OUT. This way the output transistor MPOUT sources the load current and the delayed and attenuated replica of said load current.

Figure 2:
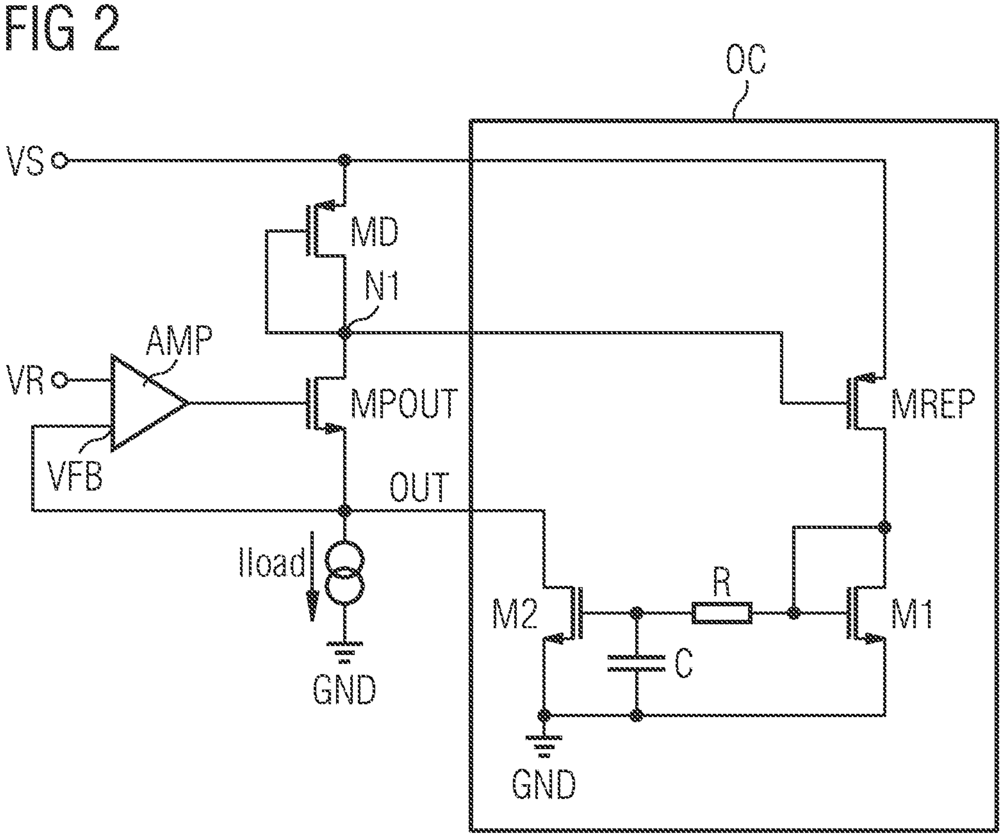
FIG. 2 shows another example embodiment of voltage regulator.

FIG. 2 shows an example embodiment of voltage regulator comprising an amplifier AMP and an overshoot circuit OC. This implementation is based on the one shown in FIG. 1 and operates similarly as the circuit discussed with respect to FIG. 1. However, the output transistor MPOUT is a NMOS transistor instead. The replica transistor is a PMOS transistor. The current mirror comprises a diode-connected PMOS transistor MD. In this embodiment of the voltage regulator the output side of the amplifier AMP is electrically connected to the output transistor MPOUT, e.g. to the control side, or gate, of the output transistor MPOUT. The control sections, e.g. gates, of the diode-connected transistor MD and the replica transistor MREP are electrically connected to each other via a circuit node N1. Furthermore, the controlled sections of the diode-connected transistor MD and the replica transistor MREP are electrically connected to each other. For example, the source of the diode-connected PMOS transistor MD is electrically connected to the source of the replica transistor MREP. The output transistor MPOUT is connected to the circuit node N1 via its controlled section, e.g. via drain. The supply terminal VS is connected to the diode-connected transistor MD and the replica transistor MREP.

Figure 3:
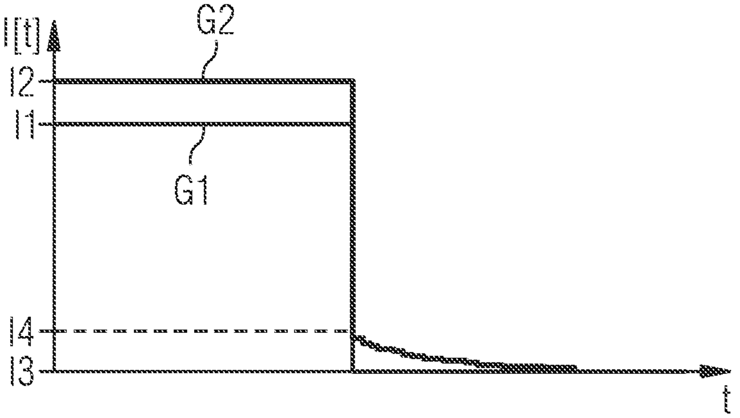
FIG. 3 shows an example of a load transient of a voltage regulator.

FIG. 3 shows an example of a load transient of a voltage regulator. The drawing shows the load transient represented by the load current I(t) as a function of time t. A first graph G1 shows a load transient without the overshoot circuit OC present, a second graph G1 shows the effect of the overshoot circuit OC, e.g. for the circuits discussed with respect to FIGS. 1 and 2. As discussed above the overall load current of the voltage regulator can be represented as the sum of the load current due to the load current source, denoted Iload, and the re-injected attenuated load current, i.e. replica.

In the event of an overshoot event the load current rises up to a first value. This first value equals I1=Iload in graph G1. For large values of k, a corresponding first value in graph G1, however, can be approximated by I2=Iload·(1+1/k), wherein k denotes an attenuation factor of the current mirror. This additional value of the load current is due to contributions of the additional replica current coming from the overshoot circuit OC. After the overshoot event the load current may drop to a second value, denoted I3, which may hold a minimum value or be equal zero in the case of graph G1, for example. With the overshoot circuit OC the filtering causes the replica to be re-injected with a certain time delay. Thus, in case of an overshoot event the overall load current may not instantaneously drop to low current levels, or to the zero load current level, but rather to a fraction of the initial load current before the overshoot event. In graph G2 the overall load current drops to a third value given as I4=Iload/k. Furthermore, due to ongoing parallel and delayed re-injection of the replica the overall load current settles on a slower time scale. This can be approximated as an exponential decay which is proportional to $$\frac{Iload}{k}\cdot\left(1-e^{-\frac{t}{\tau}}\right),$$

wherein τ denotes a time constant of the RC filter. As a result the amplifier AMP within its bandwidth reacts over an overall load transition which, starting from a comparably large first value I1, may abruptly drop not to the smallest possible value but to a value which is 1/k of the starting point I1. Then load settling to zero is so slowly to be easily tracked by the amplifier AMP, i.e. changes in the load transient are on a time-scale which is trackable by the amplifier AMP. If the attenuation factor k is small enough, a large swing variation at the output transistor Mpout, e.g. at its gate, on a short time can be prevented.

For example, k=100 ensures the same effect as the load transition from 10 mA to zero would be stopped at 100 μA. This makes it easier for the amplifier AMP to track the load transient. In addition, if a spike due to an overshoot event occurs in the load current, the residual current expressed in the equation above will contribute to discharge the output faster. As a result, the voltage regulator may dissipate 2·Iload/k times more (or half of this value in case the current mirror has a larger gain than unity). This may result in a negligible contribution in case Iload is near its smallest value or boundary. In general, the attenuation factor k is a real number. Its exact value may be determined by the replica transistor, e.g. in view of the output transistor or diode-connected transistor MD in the current mirror. For example, the width-to-length ratio of the replica transistor determines the value of the factor k. An actual value for k may be determined along the following considerations. First, k should have a lower limit. In fact, proposed overshoot event circuit is based on a positive feedback whose gain is less that unity. This depends on the product between 1/k and the gain of the current mirror which re-injects the filtered replica current back into the output node. Second, a large value for k supports reduced power consumption but may degrade matching in the replica device and might cause a slower response, slower that the one determined by the filter circuit.

Implementing the overshoot circuit OC the load current profile, i.e. load current as a function of time, can be made smoother and may allow the amplifier AMP to track the load current profile more easily. The amplifier may provide a desired response even after an overshoot event and keep the positive output variation small. It should be noted, however, that the overshoot circuit OC is effective only for positive overshoot events. Negative overshoot events are not affected in a meaningful manner because the replica load current is much smaller in value than a value where the voltage regulator should settle. In contrast to other solutions the proposed concept exploits sensing of the load current not to act the amplifier bias but to modify the load current profile. As a loop gain remains unaltered, constraints on amplifier stability or dynamic range are of minor or no concern. In addition, it has been found that the proposed concept is not alternative but synergic to other voltage regulator designs and, thus, can be added to existing circuit layout.

Figure 4:
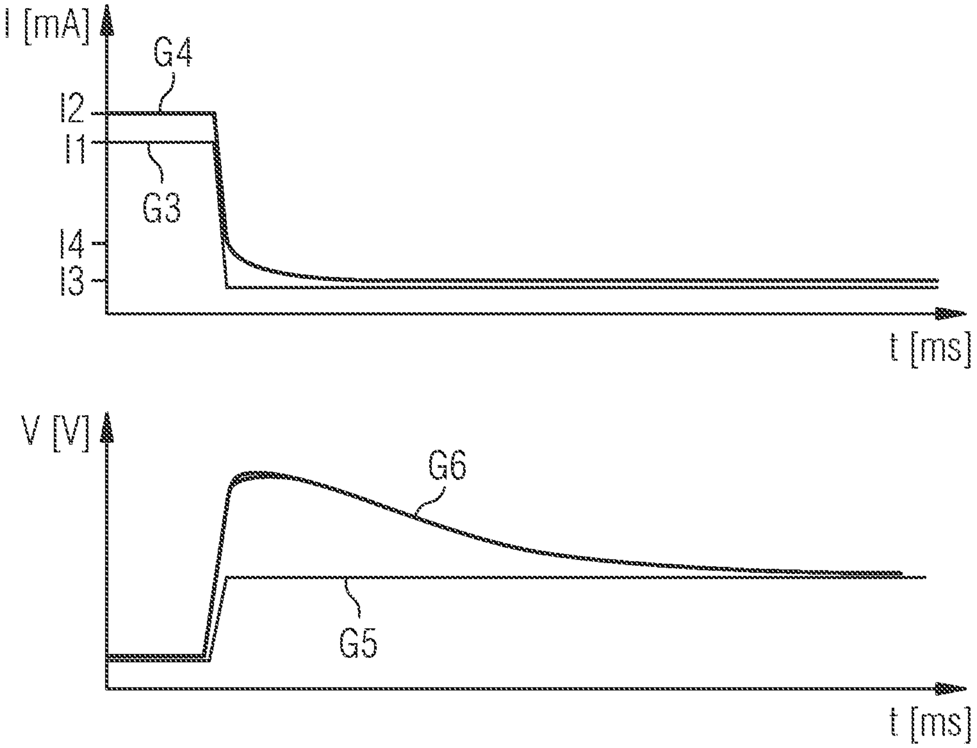
FIG. 4 shows another example of a load transient of a voltage regulator.

FIG. 4 shows another example of a load transient of a voltage regulator. The drawing shows a comparison between a common capacitorless voltage regulator and the proposed concept. It is assumed that the capacitorless voltage regulator operates under a load variation from 10 mA to 10 μA and the replica element mirrors 1/20 of the load current. Graphs G3 and G6 show the transient function of load current and voltage of the capacitorless voltage regulator, respectively. Graphs G4 and G5 show the transient function of load current and voltage at the output terminal of a voltage regulator according to the proposed concept. Graphs G3 and G4 are similar to graphs G1 and G2 from FIG. 3. A comparison of the two graphs shows the different time scales involved in settling after an overshoot event has occurred. The graphs span from 1 μs, where the load transition takes place, to 10 μs, where the voltage settles almost completely.

In graph G3 the load current due to an overshoot event drops from the comparably large first value I1 almost instantaneously or abruptly to the much smaller value I3. Using the overshoot circuit OC the transition may occur not to the smallest possible value but to a value which is 1/k of the starting point I2. The terms "almost instantaneously" or "instantaneously" can be seen as depending on a slew rate of the amplifier AMP. The slew rate can be defined as the change of voltage or current per unit of time, e.g. volts/second or amperes/second. Typically, the amplifier is specified to have a minimum or maximum limit on slew rates for their inputs and/or outputs. An almost instantaneous or instantaneous transition can, in general terms, be considered a transition occurring at a rate higher than the maximum limit on the corresponding slew rate of the amplifier AMP. In these examples discussed herein such transitions occur on a time scale a fraction of 1 μs, e.g. 100 ns. It is apparent from graph G3 that the load current of the regular voltage regulator may settle the same time scale (see load current value I3). With the proposed overshoot circuit OC the load current profile drops only to I4 and settles towards I3 from there. A time to settle is in the range of 10 μs. Graphs G5 and G6 show a similar behaviour but indicate voltages instead. Furthermore, the graph G5 indicates a regulated voltage variation. Making a smoother load current variation by means of the proposed overshoot circuit OC, achieves a remarkable reduction in the regulated voltage peak, e.g. 100 mV instead of 320 mV shown in the drawing. In fact, a voltage overshoot has been nearly removed with the employment of proposed overshoot event circuit.

Figure 5:
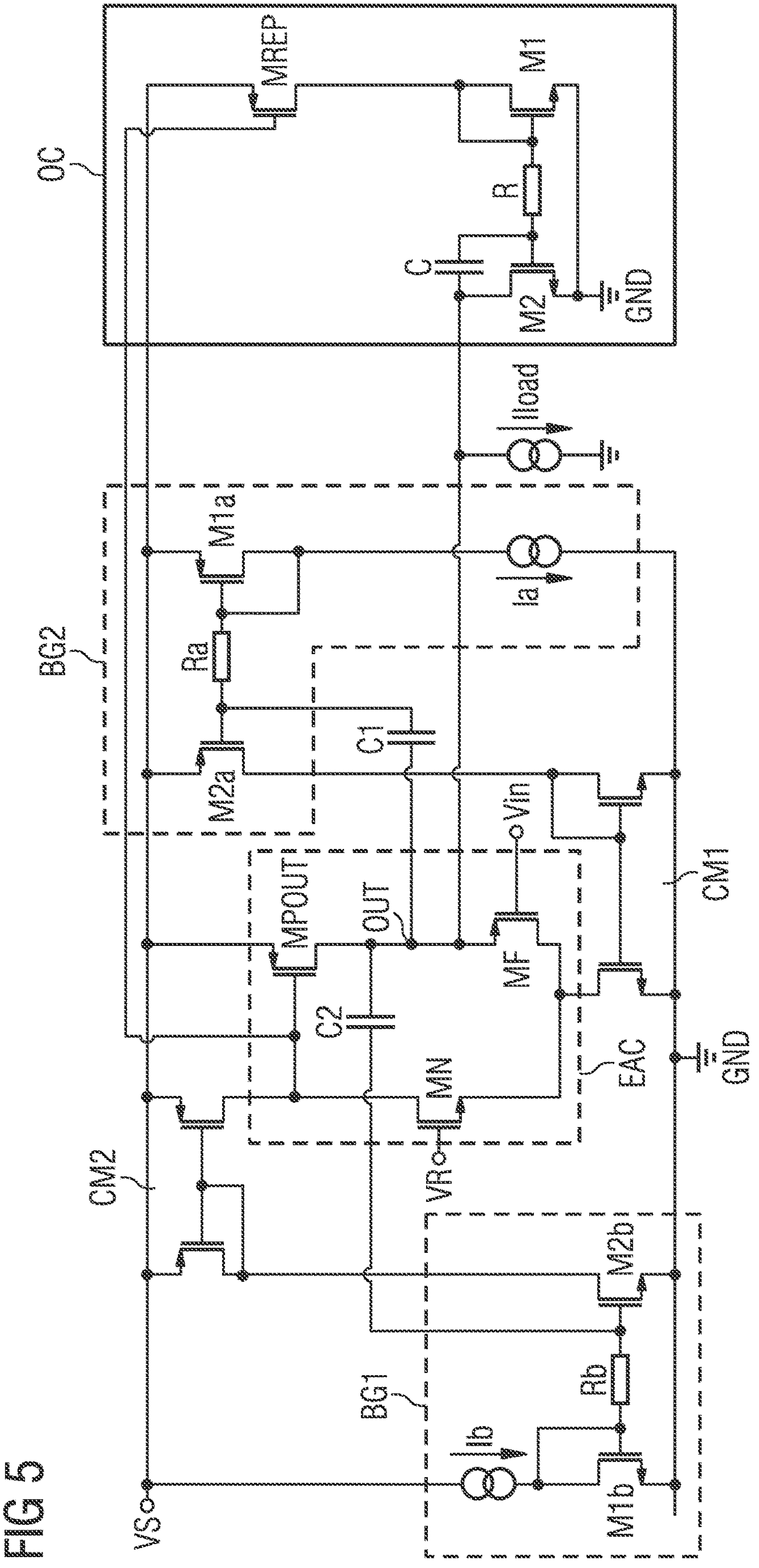
FIG. 5 shows another example embodiment of voltage regulator.

FIG. 5 shows another example embodiment of voltage regulator. In this embodiment the amplifier AMP comprises an amplifier core AC with an error amplifier EA, as well as a first and a second bias-current generator BG1, BG2. The error amplifier EA comprises an input transistor MF which is connected, via the output terminal OUT, in series to the controlled section of the output transistor MPOUT and, via its control section, connected to an input terminal VIN. Furthermore, a folding transistor MN is connected between the controlled section, gate, of the output transistor MPOUT and the controlled section, drain, of the input transistor.

The first and second bias-current generators BG1, BG2 comprise a first and a second tail current source Ia, Ib, respectively. Furthermore, the first and second bias-current generators BG1, BG2 are coupled to a first and a second current mirror CM2, CM1, respectively. The first tail current source Ia is connected between GND, a first transistor M1*a* of the first current mirror, comprising transistors M1*a*, M2*a*, as well as to a connecting branch of the first current mirror CM1 having a first resistor Ra. The second tail current source Ib is connected between the supply terminal VS, a first transistor M1*b* of the second current mirror, comprising resistors M1*b*, M2*b*, as well as to a connecting branch of the second current mirror having a second resistor Rb. The first and the second tail current sources Ia, Ib are coupled to the output terminal OUT via a first and a second coupling capacitors C1, C2, respectively. In fact, the coupling is established via the first and the second resistors Ra, Rb which connect the connecting branch of the first and second current mirrors to the first and second coupling capacitors C1, C2, respectively.

Further current mirrors CM1, CM2 connect transistors M2*a* and M2*b* to the error amplifier and the supply terminal, respectively. The second tail current source Ib, the current mirror CM2, the error amplifier via the output transistor MPOUT, the transistors M1*a*, M2*a* and the replica transistor Mrep are connected to the supply terminal VS. The first tail current source Ia, the current mirror CM1 and the transistors M1*b*, M2*b* are connected to the GND. The overshoot circuit OC is connected to the amplifier AMP as discussed in the embodiments of FIGS. 1 and 2, i.e. via the output transistor MPOUT and the output terminal OUT.

The overshoot circuit OC when compared to the embodiments of FIGS. 1 and 2 is connected differently. Instead of being terminated to ground potential GND the capacitor C from the filter circuit is coupled via one terminal to the output terminal OUT.

The amplifier AMP constitutes an output-capacitorless low-dropout regulator with a direct voltage-spike detection. Basically, the amplifier AMP makes use on capacitive coupling and a rapid transient voltage at the output terminal OUT. This way a bias current can be increased almost momentarily. Based on the input transistor MF as input element, it generates a regulated voltage at the output terminal OUT by means of a feedback loop that comprises the folding transistor MN as folding element and the output transistor MPOUT as power transistor.

The capacitors C1 and C2 couple spikes occurring in the output to the bias current generators BG1, BG2 in order to temporarily increase a bias current and thereby promptly suppresses the spike itself. As a consequence the transient response of the amplifier is significantly enhanced due to an improvement of the slew rate at the gate of the power transistor MPOUT.

Considered alone direct voltage-spike detection of the amplifier AMP comes at a price. For example, the signal path across the boosting capacitors C1, C2 comprises current mirrors so that the response may be slowed down. The AC stability may be affected by the gain boosting that increases the HF gain. A stability issue might come in case of large boosting. Furthermore, capacitive coupling might inject noise, e.g. capacitor C1 couples directly the supply terminal to the output, thus, affecting HF PSRR.

The inherent voltage-spike detection is complemented with the overshoot circuit OC according to the proposed concept. As discussed above, the load current is mirrored and filtered. In this way a delayed version of it is re-injected at the output to prevent overall abrupt load variations. Thus, the capacitive coupling approach inherent to the amplifier can be also applied inside our invention: the filter in the red box has C not terminated to GND, as shown in FIG. 3, but to Vout: in case the overshoot has already been triggered, this makes the current subtracted from the current generator higher to oppose to it.

The overshoot circuit OC does not alter the loop stability when connected to the amplifier as it does not boost the bias or generates a current into the amplifier core AC. The overshoot circuit OC operates in synergy, not alternative, to the amplifier. Furthermore, the circuit does not rely upon capacitive injection so that no PSSR concern might arise. Basically, the overshoot circuit OC alters the overall current profile, hence, additional current mirrors and providing of fast paths in the amplifier can be avoided or at least be reduced.

Time constant of RC may be the result of a tradeoff consideration. The bandwidth of the amplifier determines its ability to track an input load current, e.g. by means of its slew rate. Within the boundaries of its slew rate a smooth load transient allows for easier tracking. This may be better supported by a large time constant. A large time constant, however, may prevent short overshoot event current pulses from being tracked and may render the overshoot protection less effective. Nevertheless, if the load current pulse is very short, the amplifier may not be able to track the load current in either case, so no overshoot due to an excessive current injected from the power transistor into the output terminal might be recognized by the amplifier after the pulse expires. This leaves some room for a time constant value large enough to ensure an acceptably smooth profile. In order to address short pulses and a smooth profile of the load transient different time constant can be implemented in the filter circuit. For example, one short to immediately track a positive load current variation, one long to make a smooth current profile when the load current is decreasing.

Furthermore, the alternative coupling of the capacitor C from the filter circuit to the output terminal OUT has an additional effect on overshoot performance. The filtering due to the filter circuit remains unaffected, e.g. the resistor R of the filter circuit sees the capacitor C amplified by the Miller effect. However, in addition, the capacitor C couples the output terminal OUT to transistor M2. For example, transistor M2 is configured as NMOS transistor and connected to the capacitor C via its gate. This way transistor M2 acts as an NMOS current generator. Coupling of both the capacitor C and the transistor M2 implements an additional bias boosting and complements the boosting capacitors C1, C2. In particular, the proposed overshoot circuit OC embodies a boosting of current that pulls down the regulator output directly at the output terminal OUT, i.e. instead of the gate of the power transistor, for example, when the output has a positive spike. This contributes to further reduce overshooting at the output.

Figure 6:
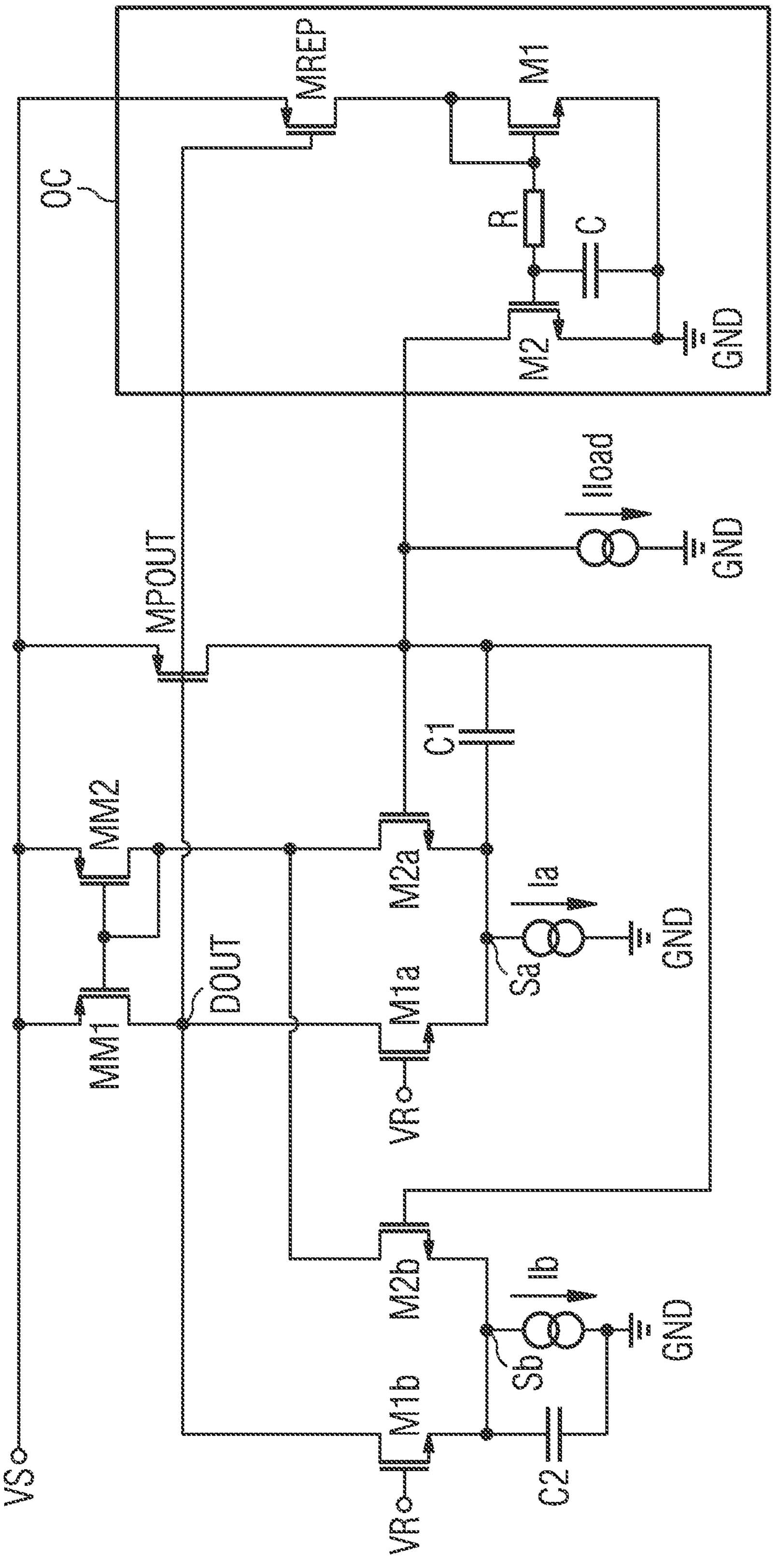
FIG. 6 shows another example embodiment of voltage regulator.

FIG. 6 shows another example embodiment of voltage regulator. The output transistor MPOUT is connected with its controlled section between the supply terminal VS and the output terminal OUT. For example, a drain connection of the output transistor MPOUT is connected to the output terminal OUT. The output transistor MPOUT is controlled by means of the amplifier AMP, which in this embodiment comprises input transistors M1, M2 and pairs of input transistors M1*b*, M2*b*, and M1*a*, M2*a*. The pairs of input transistors are supplied by a current mirror structure comprising mirror transistors MM1, MM2.

Furthermore, the amplifier AMP has a first pair of input transistors M1*a*, M2*a* and a second pair of input transistors M1*b*, M2*b*. The drain terminals of the input transistors M1*a*, M2*a*, M1*b*, M2*b* are connected to the current mirror structure MM1, MM2. For example, the respective first transistors M1*a*, M1*b* share their common drain connection being connected to the first mirror transistor MM1, while the respective second transistors M2*a*, M2*b* share their common drain connection being connected to the second mirror transistor MM2. The drain connection of the first transistors M1*a*, M1*b* forms or is connected to an output DOUT of the amplifier AMP. Control terminals of the first transistors M1*a*, M1*b* are both connected to the reference input VR, while the control terminals of the second transistors M2*a*, M2*b* are commonly connected to the feedback input VFB. The input transistors M1*a*, M2*a* of the first pair share a common source Sa, to which a tail current source Ia of the first pair is connected. In a similar fashion, the input transistors M1*b*, M2*b* of the second pair share a common source Sb, to which a second tail current source Ib of the second pair is connected. The respective second ends of the tail current sources Ia, Ib are connected to the ground potential terminal GND. A first capacitive element C1 is connected between the common source Sa of the first pair and the output terminal OUT. The second capacitive element C2 is connected between the common source Sb of the second pair and a second supply terminal, which in this embodiment is the ground potential terminal GND.

During normal operation the first differential pair and the second differential pair act in a parallel, e.g. due to their corresponding connections to the reference input VR and the feedback input VFB. However, due to the separated common sources Sa, Sb, an interaction, at least a direct interaction between the first and the second capacitive element C1, C2 is reduced during the presence of load changes at the output terminal OUT.

Only one of the capacitive elements C2, C2 becomes active as a boosting element if a spike of the load with a specific direction respectively sign occurs. If the output has a positive spike, the input transistors M2*a*, M2*b* of the second differential pair both act as voltage followers. While the first capacitive element C1 is bootstrapped and gives no transient current, the second capacitive element C2 undergoes the same spike amplitude at its terminals and an appropriate current is injected in parallel to the tail current contributed by the second tail current source Ib. This results in a pull-up capability at the output DOUT and the gate terminal of the output transistor MPOUT, which is promptly or almost promptly turned off to reduce the spike amplitude. This is, for example, effected because the transistor M2*b* conducts more than the transistor M1*b* due to the larger gate voltage.

A load transition with a large negative spike affects the output terminal OUT such that only the first transistors M1*a*, M1*b* conduct, whereas the second transistors M2*a*, M2*b* are not able to track their gate drops with their source. As a result, the common sources Sa and Sb both stay at a constant voltage. This means that while no transient current crosses the second capacitive element C2, the first capacitive element C1 sees the output spike at its terminals, such that a transient current is injected in the first differential transistor pair M1*a*, M2*a* with the same sign as the current contributed by the first tail current source Ia. Hence, only the first transistor M1*a* of the first pair is conducting, resulting in an appropriate pull-down capability at the amplifier output DOUT and the gate of the output transistor MPOUT. This results in turning on the output transistor MPOUT in order to attenuate the output spike amplitude.

REFERENCE NUMERALS

AC amplifier core
AMP amplifier
BG1, BG2 bias-current generator
C, C1, C2 capacitor
CM1, CM2 current mirror
DOUT output
G1-G6 graph
GND ground potential
M1, M1*a*, M1*b* transistors
M2, M2*a*, M2*b* transistors
MD diode-connected transistor
MF input transistor
MM1, MM2 mirror transistors
MN folding transistor
MPOUT output transistor
MREP replica transistor
I1 to I4 current values
Ia, Ib tail current source
Iload load current source
N1 circuit node
OUT output terminal
OC overshoot circuit
R, Ra, Rb resistors
RC filter circuit
Sa, Sb common source
t time
VFB feedback input
Vin input terminal
VR reference input
VS supply terminal

The invention claimed is:

1. A voltage regulator, comprising
an output transistor with a controlled section connected between a first supply terminal and an output terminal,
an amplifier comprising a reference input, a current mirror comprising a replica transistor, wherein the current mirror is configured to mirror and attenuate a load current supplied by the output transistor to the replica transistor, and a filter circuit coupled to a controlled section of the replica transistor and coupled to the output terminal, such that the attenuated and filtered load current is re-injected in parallel to the load current via the output terminal.

2. The voltage regulator according to claim 1, wherein the output transistor and the replica transistor are PMOS transistors, and the current mirror comprises the output transistor such that the controlled sections of the output transistor and the replica transistor are electrically connected to each other.

3. The voltage regulator according to claim 1, wherein the output transistor is an NMOS transistor, the current mirror comprises a diode-connected transistor such that the controlled sections of the diode-connected Transistor and the replica transistor are electrically connected to each other's control sides, and the output transistor is connected to a circuit node via the controlled sections of the output transistor.

4. The voltage regulator according to claim 1, wherein the replica transistor is configured to attenuate the load current by a factor k, wherein the factor k is a real number.

5. The voltage regulator according to claim 4, wherein the factor k is determined by the replica transistor.

6. The voltage regulator according to claim 1, wherein:

the filter circuit comprises a cascaded current mirror, and the cascaded current mirror is connected to a controlled section of the replica transistor, and, via the output terminal, connected to the controlled section of the output transistor.

7. The voltage regulator according to claim 1, wherein at least one of:

the filter circuit comprises a resistor-capacitor network with at least one time constant, and the resistor-capacitor network comprises at least one resistor and capacitor, wherein the capacitor is coupled to a ground potential or to the output terminal.

8. The voltage regulator according to claim 7, wherein the time constant depends on a bandwidth of the amplifier such that the mirrored and attenuated load current is re-injected via the output terminal on a time-scale trackable by the amplifier.

9. The voltage regulator according to claim 6, wherein a resistor-capacitor network is arranged in a connecting branch of the cascaded current mirror.

10. The voltage regulator according to claim 1, wherein the amplifier comprises an output-capacitorless low-dropout regulator.

11. The voltage regulator according to claim 1, wherein the amplifier comprises:

an amplifier core comprising the output transistor and an error amplifier, the error amplifier comprising an input transistor connected, via the output terminal, in series to the controlled section of the output transistor and, via its control section, connected to an input terminal, and comprising a folding transistor coupled between the controlled section of the output transistor and the controlled section of the input transistor, and a first and a second bias-current generator comprising a first and a second tail current source, respectively, wherein the first and the second tail current source are coupled to the output terminal via a first and a second coupling capacitor, respectively.

12. An integrated circuit comprising:

at least one or more digital and/or analog circuits, and further comprising a voltage regulator according to claim 1.

13. A method for voltage regulation, comprising:

sensing a load current by an output transistor of a voltage regulator, mirroring and attenuating the load current supplied by the output transistor to a replica transistor, filtering of the attenuated load current by means of a filter circuit coupled to the replica transistor, and re-injecting the attenuated and filtered load current as additional load current of the voltage regulator.

14. The method according to claim 13, wherein the attenuated and filtered load current is re-injecting in parallel to the load current and after having been filtered by means of the filter circuit.

15. The method according to claim 13, wherein the filter circuit has at least one time constant which depends on a bandwidth of the amplifier such that the mirrored and attenuated load current is re-injected via the output terminal on a time-scale trackable by the amplifier.

16. A voltage regulator, comprising an output transistor with a controlled section connected between a first supply terminal and an output terminal, an amplifier comprising a reference input, a current mirror comprising a replica transistor, wherein the current mirror is configured to mirror and attenuate a load current supplied by the output transistor to the replica transistor, and a filter circuit coupled to a controlled section of the replica transistor and coupled to the output terminal, wherein the output terminal is an NMOS transistor, the current mirror comprises a diode-connected transistor such that the controlled sections of the diode-connected transistor and the replica transistor are electrically connected to each other's control sides, and the output transistor is connected to a circuit node via the controlled sections of the output transistor.

* * * * *